July 18, 1933.  L. K. WARMAN  1,918,439
CHUCK
Filed Nov. 22, 1930
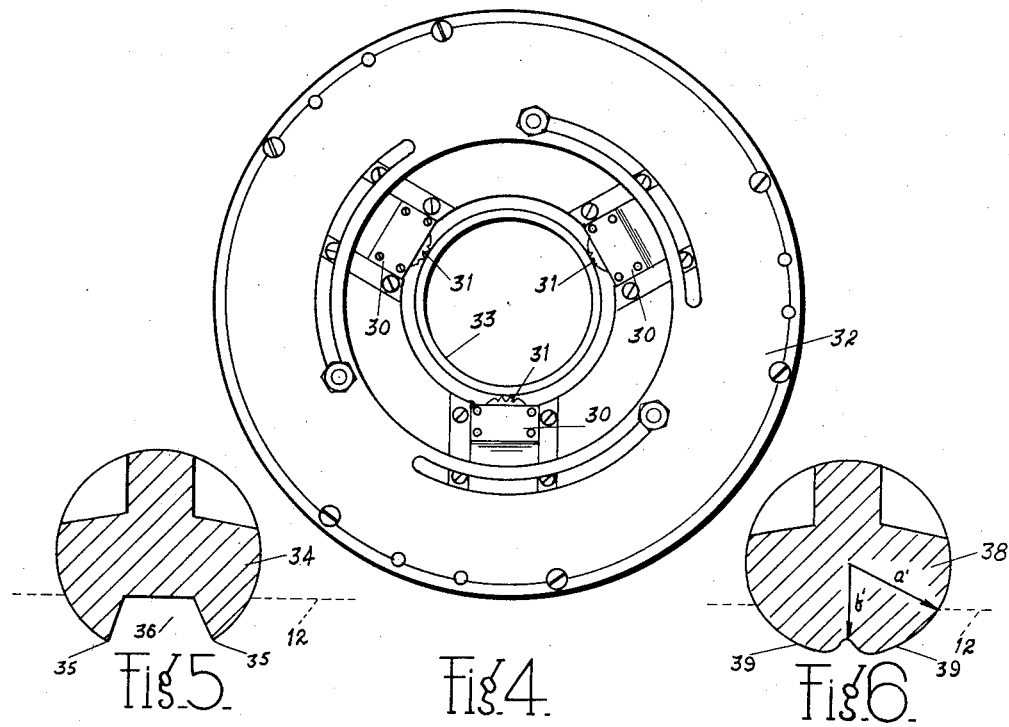
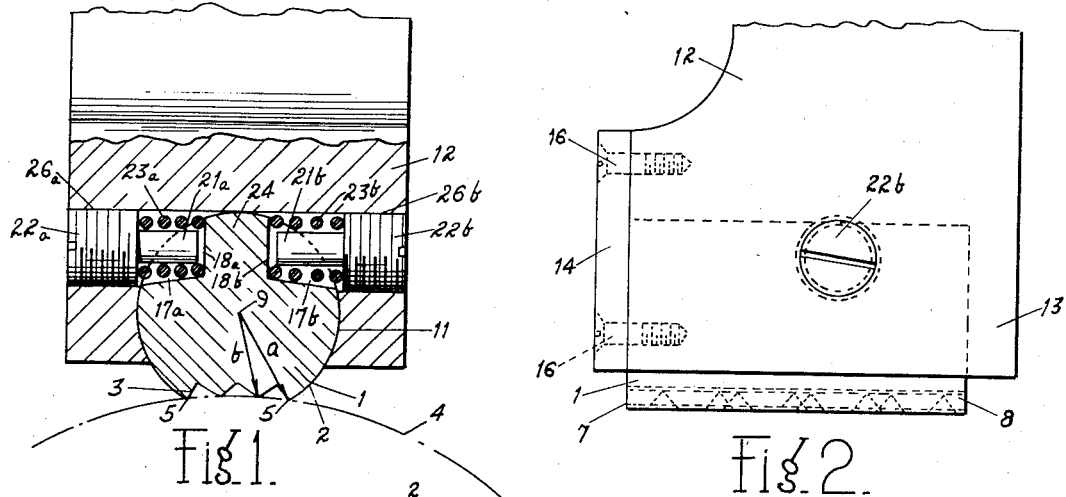
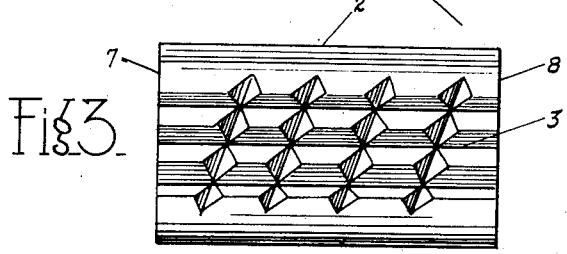
INVENTOR.
LAWRENCE K. WARMAN.
BY Philip S. Hopkins
ATTORNEY.

Patented July 18, 1933

1,918,439

UNITED STATES PATENT OFFICE

LAWRENCE K. WARMAN, OF ERIE, PENNSYLVANIA, ASSIGNOR TO WILLIAMS TOOL CORPORATION, OF ERIE, PENNSYLVANIA, A CORPORATION

CHUCK

Application filed November 22, 1930. Serial No. 597,409.

This invention relates to chucks in general and more particularly to an improved chuck jaw.

An object of this invention is to grip an article in a chuck by a slight relative motion between the article and a chuck jaw and to release the article by a slight relative motion in the opposite direction.

Another object of this invention is to grip a bar or tube by a plurality of chuck jaws so designed and arranged in a chuck that the jaws press against the bar or tube upon slight relative rotation thereof in either direction.

A further object of this invention is to use a portion of the turning force or torque exerted upon a piece of material to hold the piece of material in a chuck and thereby to prevent its turning relative to the chuck.

In the past it has been customary to provide a chuck with three or four jaws which are movable in radial grooves or slots in the chuck and which hold an article in the chuck by exerting direct radial pressure thereon, depending upon friction between the jaws and the article to prevent slipping therebetween. The jaws may be separately movable, usually by a screw device, or means may be provided to move all of the jaws equally with reference to the center of the chuck, provided the jaws are first equally spaced from the center. One defect of such chucks as usually made is that the gripping force of the jaws depends upon the radial pressure which is originally placed on the article in the jaws and bears no relation to the torque which tends to make the article slip in the chuck. If the torque exceeds the gripping force the article will slip. To maintain this radial pressure dependence is placed upon friction in the pressure exerting means. To release the article from the chuck the jaw moving means must be operated in the reverse direction. Experience has shown that, adjusting the chuck jaws, operating the radial pressure means and subsequently releasing the article from the chuck involve the expenditure of considerable time and muscular effort by the operator of the chuck.

The present invention provides chucking means in which the gripping force increases as the torque is increased thereby preventing slip between the chuck and the article held therein. When the torque is removed the gripping force drops to a low value permitting easy and quick removal of the article from the chuck. By the use of chucks having jaws made according to this invention much time and human energy are saved.

The aforementioned objects are accomplished and the above advantages are realized by providing a chuck with one or more substantially cylindrical jaws and holders for the jaws, each having a slot or cavity therein conforming to a portion of the periphery of a jaw. Means are provided for limiting the rotation of the jaws in their respective holders and the portions of the jaws protruding from the holders are adapted to grip articles placed in the chuck. Further objects and advantages of this invention will be apparent to those skilled in the art and by reference to the following description and to the figures of the accompanying drawing in which are described and illustrated several embodiments of this invention and in which:—

Figure 1 represents a chuck jaw arranged in a holder in accordance with this invention, the figure being partly in section;

Figure 2 is a side elevation of Figure 1;

Figure 3 is a plan view of the chuck jaw shown in Figure 1, showing the gripping surface of the jaw;

Figure 4 is a front view of a chuck which is provided with three jaws and holders, made in accordance with this invention, and shows a piece of tubing in the chuck; and Figures 5 and 6 show alternative forms of chuck jaws in section with special reference to the gripping portions thereof.

Referring now to Figures 1 and 2, reference character 1 indicates a chuck jaw having a substantially cylindrical periphery 2 with a portion of its surface 3 shaped to grip an article indicated by circular line 4. An essential feature of chuck jaw 1 is that the dimension $(a)$ from its central axis 9 to either gripping point 5—5 be greater than a distance $(b)$ from axis 9 to any point on the surface 3 of jaw 1. The ends 7 and 8 of chuck jaw 1 are substantially perpendicular to its central axis 9.

Chuck jaw 1 is mounted in cavity 11 in holder 12. The surface of cavity 11 conforms substantially to the periphery 2 of the jaw 1 which is not entirely enclosed by the holder 12 but has a portion adjacent the gripping surface 3 disposed external to the holder. Motion of jaw 1 is an axial direction is limited by the rear wall 13 of the cavity 11 and by a plate 14 attached to holder 12, as by screws 16.

At a convenient point along the length of jaw 1, preferably near the center, two cavities 17a and 17b are provided above the axis 9. The ends of these cavities, 18a and 18b respectively, are substantially parallel to each other and to a plane passing through axis 9 and the center of surface 3. Cavities 17a and 17b are shaped to provide clearance for the end portions 21a and 21b of stop members 22a and 22b respectively and for spring members 23a and 23b disposed in the clearance space. Stop members or set screws 22a and 22b are adjustable with reference to the web or tongue 24 formed in jaw 1 by cavities 17a and 17b, by means of the threaded portions 26a and 26b thereof cooperating with similarly threaded holes in holder 12.

As usually adjusted the adjacent ends of set screws 22a and 22b are spaced from tongue 24 thereby allowing jaw 1 to rotate in cavity 11 through a small angle but preventing any further rotation of jaw 1. The springs 22a and 22b are substantially equal and normally hold the tongue 24 equally distant from the adjacent ends of stops 22a and 22b. It is readily seen therefore, that if an article 4 is lightly pressed against surface 3 when jaw 1 is in the normal position, a slight rotation of article 4 in either direction will cause rotation of jaw 1 in cavity 11 thereby causing a gripping edge 5 of jaw 1 to press more firmly against article 4. If the center of article 4 is prevented from moving away from the axis 9, as by stops or similar chuck jaws on the opposite side of article 4, additional turning force or torque will cause additional pressure between the gripping edge and article 4 thereby securely holding the article between jaw 1 and the stops or similar jaws disposed about the periphery of article 4. The pressure and therefore the gripping force increases with an increase of torque so that a portion of article 4 will usually shear off before article 4 will slip relative to jaw 1. Similar results are obtained if a retarding force is applied to article 4 and the torque is applied to jaw 1 through the holder 12. It is also readily seen that a slight rotation of article 4 relative to jaw 1 in the opposite direction will cause rotation of jaw 1 in the opposite direction in cavity 11 thereby releasing the pressure therebetween.

The form of gripping surface 3 as illustrated in Figure 3 has been found to be very practical and useful but this invention is not limited to any particular form of gripping surface or edge.

Figure 4 illustrates how three holders 30 similar to 12 of Figure 1 each having a chuck jaw 31 similar to 1 of Figure 1 may be mounted in a chuck head 32 and how a piece of pipe or tubing 33 may be held by the chuck jaws 31. Holders 30 and therefore jaws 31 are movable and adjustable radially with reference to the chuck head 32, either independently or simultaneously by any one of the well known mechanisms used to move and adjust chuck jaws. It should be readily understood by inspection of Figure 4 that if an article such as the piece of tubing 33 is placed in the chuck head and if the holders 30 are then moved toward the center of the chuck head until they all press lightly on tubing 33, a slight relative rotation in either direction between tubing 33 and chuck head 32 will cause jaws 31 to rotate in holders 30 and thereby firmly grip the tubing 33 as explained above. When operations are completed on tubing 33, a slight rotation in the opposite direction relative to chuckhead 32 releases the tubing. When a number of pieces of substantially the same diameter are chucked and released in succession, it is necessary to adjust the holders 30 only for the first piece. The jaws 31 provide clearance for axial movement of the pieces but when turned their edges firmly grip the pieces. Thus, it can be seen that a saving of time and effort is effected by the use of chuck jaws in accordance with this invention. In some instances it is preferable to substitute smooth rollers for two of the jaws 31 and grip the piece 33 by the third jaw. Three jaws or supports give satisfactory results but chuck heads may be provided with four or a larger number of jaws and any part thereof may be gripping jaws similar to jaws 31 and the remainder smooth supports or rollers.

Figure 5 illustrates another form of gripping jaw 34 having two gripping edges 35—35 formed by cutting a groove 36 in a substantially cylindrical member adapted to fit into cavity 11 of holders 12 (Figure 1).

Still another form of gripping jaw 38 is shown in Figure 6. That portion of the surface of jaw 38 which in the normal position lies outside of holder 12 (indicated by dotted lines) is shaped to form a double cam 39—39. The cam surfaces 39—39 are designed to be self locking according to well known principles of cam design. Surface 39 is shaped so that radius $a'$ is the longest and radius $b'$ the shortest of all radii between $a'$ and $b'$ and so that the successive radii from $a'$ to $b'$ decrease in length. The form of jaw shown in Figure 6 is especially suitable for gripping objects having polished surfaces without spoiling the finish or making marks on the surfaces.

It should be understood that the foregoing specification and the figures of the accompanying drawing serve to describe and illustrate the present invention but the novel features which are believed to be characteristic of this invention are set forth with particularity in the appended claims.

I claim:

1. A chucking device comprising a substantially cylindrical jaw, a holder therefor having a recess in which said jaw is mounted and enclosing more than half of the surface of said jaw, means in said jaw permitting slight rotation of said jaw in said holder in the direction of the gripping action thereof and a concave gripping surface on said jaw, said holder being provided with adjustable stops in said recess for limiting the rotation of said jaw.

2. A chuck comprising a substantially cylindrical jaw, means for rotatably supporting said jaw, a web formed in said jaw and adjustable stops carried by said supporting means and cooperating with said web for limiting the rotation of said jaw relative to said supporting means.

3. A chuck as defined in claim 2 and resilient means disposed between said web and said stops for normally positioning said web midway between said stops.

4. A chucking device comprising a chuck jaw having recesses therein forming a web between said recesses, a holder for said jaw having a cavity in an end thereof partially engaging said jaw and conforming to the surface thereof, said jaw being rotatable in said cavity, means carried by said holder for closing the ends of said cavity, stops carried by said holder projecting into said cavity and adjustably disposed on opposite sides of said web and coil springs carried by said stops and bearing against opposite sides of said web, said springs and stops cooperating with said web to control and limit respectively the rotation of the jaw in said holder.

LAWRENCE K. WARMAN.

CERTIFICATE OF CORRECTION.

Patent No. 1,918,439.  July 18, 1933.

LAWRENCE K. WARMAN.

It is hereby certified that error appears in the printed specification of the above numbered patent requiring correction as follows: In the heading to the printed specification, line 4, for Serial No. "597,409" read "497,409"; and that the said Letters Patent should be read with this correction therein that the same may conform to the record of the case in the Patent Office.

Signed and sealed this 12th day of September, A. D. 1933.

M. J. Moore.

(Seal)  Acting Commissioner of Patents.